United States Patent Office 3,490,751
Patented Jan. 20, 1970

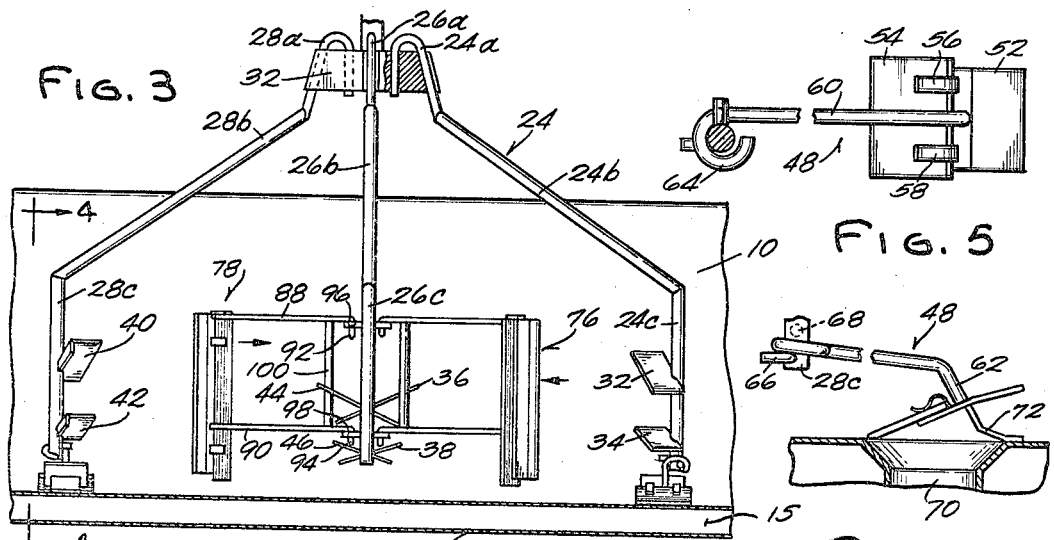
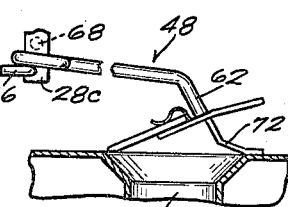
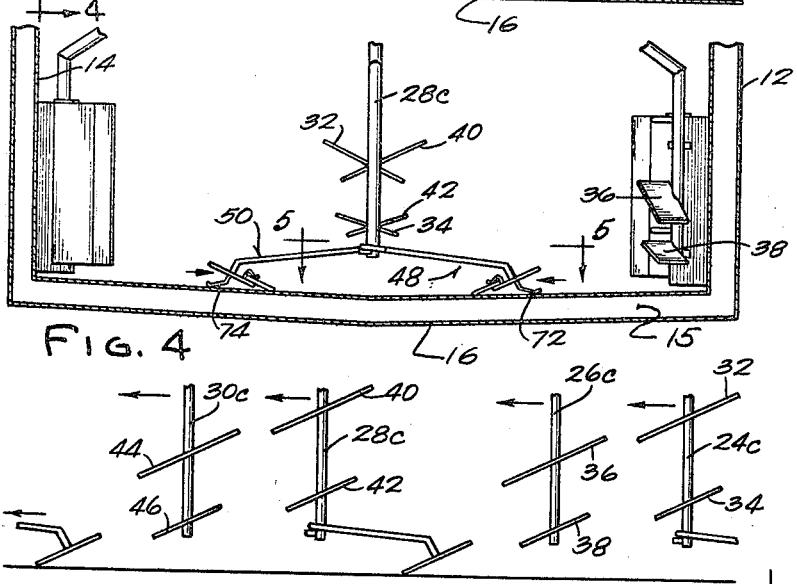
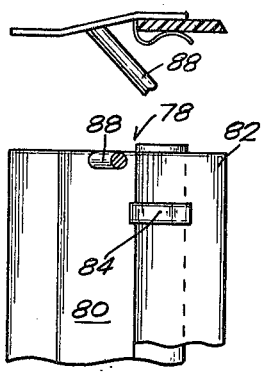
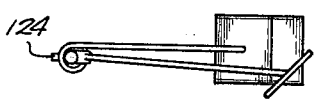
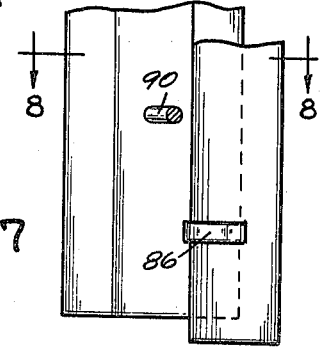
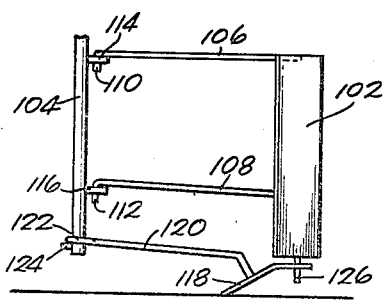

3,490,751
STIRRING PADDLE ASSEMBLY FOR PROCESS VAT
Meredith C. Thomson, Oconomowoc, Wis., assignor to Stoelling Brothers Company, Kiel, Wis., a corporation of Wisconsin
Filed Sept. 27, 1967, Ser. No. 671,048
Int. Cl. B01f 7/20
U.S. Cl. 259—111                        13 Claims

ABSTRACT OF THE DISCLOSURE

This disclosure relates to a stirring paddle assembly for a processing vat. The paddle assembly includes paddle arms suspended from a carriage and movable with the carriage longitudinally of the vat. The paddle arms extend into the vat and a number of stirring blades are fixed to the paddle arms at relatively different elevations above the vat bottom. The stirring blades displace liquid product from substantially all levels of a vertical section of the tank to provide thorough stirring. The stirring blades cover substantially the full depth of the product medium in the vat but are always spaced from and do not engage either the vat bottom or side walls. To stir product medium adjacent to the vat walls, bottom, and side walls, articulated blade assemblies are attached to the paddle arms to sweep the bottom and side walls. The assemblies for sweeping the bottom wall are supported from the paddle arms for movement in a vertical plane to engage the vat bottom wall. The assemblies for sweeping the side walls are supported from the paddle arms for pivotal movement in a horizontal plane about a vertical axis and engage the vat side wall. Both the botom wall and side wall articulated blade assemblies are pulled through the product medium by their respective paddle arms and are angled with respect to their line of travel through that medium such that they are urged toward engagement with their respective vat wall. In one of its primary applications the stirring paddle assembly is used in the process of making cottage cheese.

BACKGROUND OF INVENTION

(I) Field of invention

This invention relates to stirring paddle assemblies of the type used, for example, in connection with the processing of cottage cheese.

(II) Description of prior art

This invention will be discussed in connection with the process of making cottage cheese but it will be appreciated that problems encountered in cottage cheese making are also found in other cheese making processes or generally in processing product having liquid characteristics. Therefore, although the invention will be discussed in a cottage cheese making environment it is not necessarily limited to that environment.

Various steps in the process of making cottage cheese are carried out in a process vat, e.g. curd cooking, washing creaming, etc. Stirring of the product medium is required at various stages in the process such as during the creaming step. It has been known to stir the creamed curd through the use of a traveling paddle assembly which moves through the process vat agitating the curd. Prior paddle assemblies have not been entirely satisfactory. Among the reasons for their not having been completely satisfactory is that they did not afford complete agitation of the curd in the vat because the stirring blades of the paddle assembly had only limited vertical engagement in the curd and, moreover, because clearance was required between the vat wall and the paddle blades to prevent jamming. This resulted in relatively quiescent areas of curd at the vat walls and incomplete stirring of the curd.

SUMMARY OF INVENTION

In accordance with this invention, a stirring paddle assembly includes a number of stirring blades fixed to paddle arms. The fixed stirring blades are supported on the paddle arms in the product medium in relatively vertically spaced relationship so that as the blades rotate with the paddle arms through the product medium they pass through different vertical levels of the product medium. In addition to the fixed stirring blades, the stirring paddle assembly is also provided with a number of articulated blades which travel through the product medium and engage the vat walls to insure complete stirring of the product medium. The articulated blades are supported for movement toward and away from the walls they are intended to engage and are so arranged that they are capable of following the contour of the vat walls without jamming. The articulated blades are urged toward their respective vat wall but are free to pivot with respect to those walls to accommodate variations in vat wall contour or changes in direction of travel induced in the blades by the vat walls.

DESCRIPTION OF DRAWINGS

FIG. 3 is an enlarged view of paddle assembly similar to FIG. 1 but with a portion of the vat wall removed to better illustrate the paddle assembly;

FIG. 4 is a view taken generally along line 4—4 of FIG. 3;

FIG. 5 is a view taken generally along line 5—5 of FIG. 4;

FIG. 6 is an enlarged view of one of the articulated blade assemblies which engage the bottom wall of the vat;

FIG. 7 is an enlarged elevation of one of the articulated blade assemblies which engage the vat side walls;

FIG. 8 is a section view taken generally along line 8—8 of FIG. 7;

FIG. 9 is a developed view illustrating the vertical relationship of the paddle blade assemblies;

FIG. 10 is a top plan view of an alternative articulated blade assembly;

FIG. 11 is a front elevation of the alternative construction of FIG. 10.

DESCRIPTION OF PREFERRED EMBODIMENT

Figure 1:
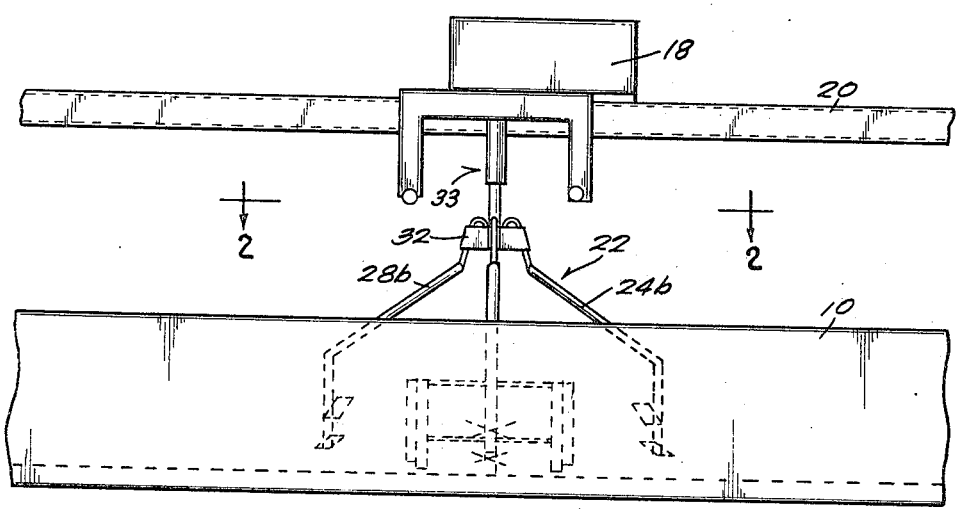
FIG. 1 is a side elevation of a stirring paddle assembly, a portion of its carriage and the process vat into which the paddle assembly extends.

In the creaming step of cottage cheese making, a suitably prepared curd is pumped, or otherwise delivered, to a process vat 10. As can be seen in FIGS. 3 and 4, vat side walls 12 and 14 and vat bottom wall 16 are made up of spaced inner and outer walls. With this arrangement the temperature of the curd can be controlled, in a conventional manner, by circulating a heating, or cooling, medium through area 15 between the inner and outer walls. For best results, the curd mixture is continuously stirred during the creaming step. To achieve this stirring, a conventional carriage 18 is supported on and moves with respect to rail 20. Rail 20 extends longitudinally of the vat and the carriage is capable of traversing substantially the entire length of the vat by movement on the rail. Stirring paddle assembly 22 is suspended from carriage 18 and extends into vat 10, the paddle assembly moving longitudinally through the vat with the carriage. The details of the carriage and the transport system in general are not necessary to a complete understanding of this invention and, for that reason, they have not been illustrated. Carriage 18 includes suitable mechanism for rotating the paddle assembly and, since this drive arrangement can take any conventional form, it has neither been illustrated nor will it be described. For example, the carriage drive and the paddle arm assembly drive can take the form of that disclosed and claimed in Patent 2,617,191 to Edgar W. Detjen and assigned to the assignee of this application.

Structurally, the paddle arm assembly includes four paddle arms 24, 26, 28 and 30. These paddle arms are connected to hub 32 which is in turn connected through drive shaft assembly 33 to the drive in the carriage. Paddle arm 24 includes hook portion 24a engaging hub 32, an angular portion 24b extending from the hook portion to vertical portion 24c which extends generally parallel to the vat side walls. Similarly, the other paddle arms include hook portions 26a, 28a, and 30a, angular portions 26b, 28b, and 30b and vertical portions 26c, 28c, and 30c, each extending parallel to the side walls.

Figure 2:
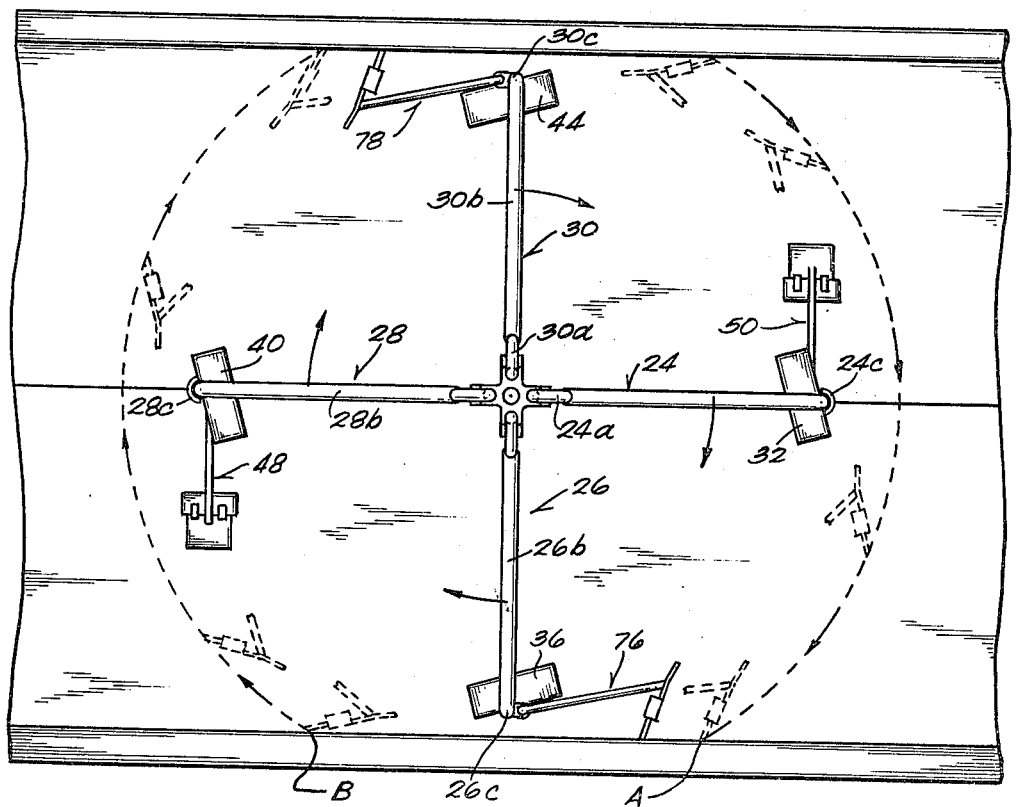
FIG. 2 is a view taken generally along the line 2—2 of FIG. 1.

The drive assembly in carriage 18 moves the paddle assembly longitudinally through the vat, and rotates the paddle arms on shaft assembly 33 in the direction of the arrows in FIG. 2. It will be noted that vertical portions 24c, 26c, 28c, and 30c terminate above the bottom wall of the vat and are always spaced from the vat side wall. A stirring blade arrangement is provided on paddle arms to stir the cottage cheese curd. Blades 32 and 34 are fixed to vertical arm portion 24c and are spaced one above the other. Proceeding clockwise from paddle arm 24, paddle arm 26 has blades 36 and 38 fixed thereto and arms 28 and 30 carry blades 40, 42 and 44, 46 respectively (see FIG. 9). Since blades 32–46 are fixed to their respective paddle arms they will be referred to as fixed blades even though they rotate with the paddle arm assembly. The fixed stirring blades are each disposed at an oblique angle to their path of movement, in the illustrated embodiment at an oblique angle to the horizontal, so as to impart an upward stirring motion to the curd as the blades pass through the curd. It will also be noted that as between adjacent paddle arms the fixed blades are staggered. More specifically, blade 34 of arm 24 spans the vertical distance between blade 36 and 38 of arm 26 and blade 36 in turn spans the vertical distance between blades 32 and 34 of arm 24. Similarly, blade 42 of arm 28 spans blades 44 and 46 of arm 30 and blade 44 spans blades 40 and 42. As can be seen in FIG. 9, the fixed blades of each arm move in pairs through different vertical levels of the curd. Blades 38 and 46 engage and move the curd from their curd stratum upwardly for engagement with blades 34 and 42 which in turn move the curd upwardly to blades 36 and 44 which engage the upwardly rising curd and direct it to the uppermost blades 32 and 40. This arrangement moves the curd from one stratum into a progressively higher stratum and achieves complete stirring through the vertical section of the curd from adjacent the bottom wall to the top level of the curd and it will be appreciated that the number of blades can be increased to accommodate various depths of curd and to insure complete mixing.

The staggered arrangement of fixed blades provides optimum stirring action on the curd while permitting the use of relatively small individual mixing blades. An increased depth of contact for efficient stirring is thus achieved and in the illustrated embodiment it will be noted that relatively small blades are used so as to reduce the drag on the drive mechanism so that the power source need not be unduly large. In this respect it will also be noted that lower blades 34, 38, 42 and 46 preferably have a relatively smaller surface area than blades 32, 36, 40 and 44 since the lower blades are more apt to be engaging denser and thus heavier curd.

The fixed blades are spaced from the side and bottom walls of the vat so as to eliminate any danger of damage or faulty operation due to jamming of the blades against those walls. By spacing the blades from those walls it is recognized that a substantial segment of the curd is not engaged by the fixed blades and remains relatively quiescent. To stir curd at the vat walls, a number of articulated blade assemblies are attached to the paddle arms for engagement with the side and bottom walls. Articulated blade assemblies 48 and 50 are attached to paddle arms 28 and 24, respectively, for engagement with and to sweep the vat bottom wall. Since both of these blade assemblies are identical only one, assembly 48, will be described in detail.

With particular reference to FIGS. 4, 5, and 6, the assembly includes a blade assembly comprising metallic plate 52 and wiper 54. The wiper is held in engagement with plate 52 by a pair of spring clips 56 and 58. The clips being attached to the metallic plate press the wiper against the plate. Wiper 54 establishes engagement with the bottom wall of the vat and is preferably made of nylon or a similar type of material to provide good sliding characteristics. The assembly also includes rod 60 having one end 62 attached to plate 52 and is turned at its opposite end 64 to provide a hook-eye. The hook-eye circles the lower end of vertical portion 28c of the paddle arm and is positioned vertically between two fixed pins 66 and 68 on the vertical arm portion. The spacing between pins 66 and 68 is greater than the thickness of the hook-eye to allow for some relative movement. With this arrangement the blade assembly will be drawn through the curd by the paddle arm but is free to pivot on the arm and move in a plane generally perpendicular to the vat bottom wall. Arrows have been placed adjacent articulated arm assemblies 48 and 50 to illustrate their direction movement. It will be noted that the blade assembly (plate 52 and wiper 54) is disposed at an oblique angle to its direction of travel through the curd, at an oblique angle to the horizontal in the illustrated embodiment. The blade assemblies slope away from the direction of travel so that, as they are drawn through the vat, the curd adjacent the vat bottom is stirred upwardly while at the same time the curd acts on the blade assembly to urge it toward engagement with the vat bottom wall. Thus, travel of the articulated blades through the curd provides an inherent biasing force urging the blades toward the bottom vat wall to sweep the bottom wall and insure complete stirring of the curd from the bottom wall to the top level of the curd. As is illustrated in FIG. 9, the articulated blade assemblies span the distance between the bottom wall and the lowermost blades 38 and 46 thereby completing total coverage for stirring through a complete vertical segment from the bottom vat wall to the top level of the curd.

In many vats, the bottom wall of the vat is provided with a number of spaced outlets such as opening 70 illustrated in FIG. 6. Since blade assemblies 48 and 50 continuously engage the bottom wall of the vat, the possibility exists that the blade may become engaged in that opening and jam. To prevent jamming, the blade assemblies can each be provided with a trailing skid, 72 and 74. The trailing skid provides an added point of support for the blade assembly and with plate 52 and wiper 54 provides an assembly capable of bridging opening 70 to hold the blade assembly out of such outlets and prevent jamming.

Articulated blade assemblies 76 and 78 are connected to paddle arms 26 and 30, respectively, to sweep the vat side walls. Again, since the two side sweep blade assemblies are identical only one will be described in detail. Blade assembly 78 (see FIGS. 7 and 8) includes metallic plate 80 and wiper 82, which is of the same material as wipers 54, connected to plate 80 by spring arms 84 and 86 in the same manner as in the bottom wall sweep blade assemblies. Two rods 88 and 90, are attached to and extend from plate 80 with each rod terminating in downturned ends 92 and 94 which fit into apertured brackets 96 and 98 attached to paddle arm 30. Vertical strut 100 provides vertical spacing between and support for rods 88 and 90. Ends 92 and 94 are free to move in brackets 96 and 98 so that the side sweep blade assemblies are attached to and movable with arm 30 but are free to pivot on brackets 96 and 98 in a horizontal plane. As with the bottom sweep blade assemblies, the blade assemblies (plate 80 and wiper 82) of the side sweeps are disposed at an oblique angle to their path of travel through the curd but slope away from the direction of travel. As the blade assemblies are drawn through the curd they tend to impart an inward, in a horizontal direction, stirring movement while the curd acts upon the blades tending to make them follow a circular path indicated by the dotted line in FIG. 2 the diameter of which is greater than the distance between the side walls. As the articulated side sweep blade assemblies approach a side wall, they engage the side wall and are displaced generally radially inward and because of their slope with respect to the direction travel they maintain linear engagement with the side walls. Again the action of the curd on the blade assemblies provides a biasing force urging the blade assemblies into engagement with the vat side walls. The side sweep blade assemblies pass through the curd adjacent the side walls to stir the curd in the areas which are missed as a result of the clearance which must be provided between the fixed blades on the paddle arms and the vat side walls. The length of the rods connecting the side sweep blades to the paddle arms is such that the points of engagement of the blade assemblies with the side walls will overlap and the entire vat side walls are swept by the side sweep blade assemblies. For example, blade assembly 76 engages the side wall between points A and B in FIG. 2 as the paddle assembly moves through the tank and the initial point of engagement of the blade assembly 78 will be between points A and B.

It will be noted that both the side and bottom sweep blade assemblies trail their respective paddle arms. This is preferred as it results in the side and bottom sweep assemblies being drawn through the curd and across their respective vat walls. With the blades being drawn through the curd and being free for movement in planes perpendicular to their respective vat walls, the possibility of jamming the sweep assemblies against the walls is substantially reduced if not completely eliminated. The side and bottom sweep blade assemblies are free to track at any angle behind their respective paddle arms and will move in mutually perpendicular planes to accommodate any irregularities in vat wall surface.

In the embodiment just described, the bottom and side sweep blade assemblies are separate from each other. An alternative arrangement is illustrated in FIGS. 10 and 11 wherein the blades are part of a common assembly. More particularly, side sweep blade 102 is attached to the vertical portion of paddle arm 104 by rods 106 and 108. The rods are connected to blade 102 and have ends 110 and 112 thereof engaged in apertured brackets 114 and 116 attached to the paddle arm. Blade 102 is movable about the pivot connection provided at brackets 114 and 116 and with respect to the side walls of the vat (not shown). The bottom sweep includes blade 118 connected to paddle arm 104 by rod 120. In this arrangement rod 120 includes hook-eye 122 which encircles a lower end of arm 104 and rests on a pin 124 fixed to the arm. Pin 124 limits downward movement of the bottom sweep. Pin 126 extends from side sweep blade 102 into an aperture (not shown) in blade 118 so that side sweep blade 102 will limit upward movement of blade 118. Again, the side and bottom sweep blades are drawn behind arm 104, are free to move forward and away from their respective vat walls and are sloped away from their direction of travel in the curd. Only the sweep portions of the embodiment of FIGS. 10 and 11 have been illustrated; the remainder of the paddle assembly and tank is identical to that of the previously described embodiment.

It will be appreciated that the stirring assembly can be provided with either the blades fixed to the paddle arms, the side sweep articulated arm assemblies or the bottom sweep articulated arm assemblies alone or any combination of two of these three arrangements.

Although this invention has been illustrated and described in connection with particular embodiments thereof, it will be apparent to those skilled in the art that various changes and modifications may be made therein without departing from the spirit of the invention or from the scope of the appended claims.

What is claimed is:
1. Apparatus of the type described comprising, in combination,
   a bat having a bottom wall and side walls extending from said bottom wall,
   a stirring assembly including at least two arms extending into said vat,
   means for rotating said stirring assembly in said vat, said arms arranged for movement in said vat one trailing the other,
   means for moving said stirring assembly, as said stirring assembly is rotating, through said vat over said bottom wall and between said side walls,
   a plurality of stirring blades connected at least one to each of said arms for movement therewith in said vat and said stirring blades positioned at relatively different distances from said bottom vat wall to pass through more than one area in said vat as said stirring assembly moves in said vat,
   said stirring blades arranged at an oblique angle to their path of movement through said vat and sloping away from said path to displace a product medium in said vat upwardly,
   said arms and stirring blades being spaced from said side walls during movement thereof in said vat,
   and including side sweep blade assemblies each including a blade and means connecting said blade to one of said arms for movement therewith and for engagement with said side walls, said connecting means further connecting said side sweep assembly blade for movement toward and away from said vat side wall and so that said blade is urged toward engagement with said side wall.

2. The apparatus of claim 1 wherein each of said side sweep assembly blades has a generally free pivotal connection with said arm and is arranged at an angle to its path of movement and slopes away from the path of movement so that the movement thereof through a liquid medium in said vat provides the force urging said side sweep assembly blade toward said side wall.

3. The apparatus of claim 2 wherein said side sweep assembly blade trails the arm to which it is connected.

4. Apparatus of the type described comprising, in combination,
   a vat having a bottom wall and side walls extending from said bottom wall,
   a stirring assembly including at least two arms extending into said vat,
   means for rotating said stirring assembly in said vat, said arms arranged for movement in said vat one trailing the other,
   means for moving said stirring assembly, as said stirring assembly is rotating, through said vat over said bottom wall and between said side walls,
   a plurality of stirring blades connected at least one to each of said arms for movement therewith in said vat and said stirring blades positioned at relatively different distances from said bottom vat wall to pass through more than one area in said vat as said stirring assembly moves in said vat, said stirring blades arranged at an oblique angle to their path of movement through said vat and sloping away from said path to displace a product medium in said vat upwardly, said stirring blades being spaced vertically above said vat bottom wall, and including bottom sweep assemblies each including a blade and means connecting said blade to one of said arms for movement therewith and for engagement with said bottom wall, said connecting means further connecting said blade for movement toward and away from said bottom wall and so that said blade is urged toward engagement with said bottom wall.

5. The apparatus of claim 4 wherein each of said bottom sweep assembly blades has a generally free pivotal connection with said arm and is arranged at an angle to its path of movement and slopes away from the path of movement so that movement of said bottom sweep assembly blade through a liquid medium provides the force urging said bottom sweep blade toward said bottom wall.

6. The apparatus of claim 5 wherein said bottom sweep assembly blade trails the arm to which it is connected.

7. The apparatus of claim 1 wherein said stirring blades are spaced vertically above said vat bottom wall, and including bottom sweep assemblies each including a blade and means connecting said blade to one of said arms for movement therewith and for engagement with said bottom wall, said connecting means further connecting said blade for movement toward and away from said bottom wall and so that said blade is urged toward engagement with said bottom wall.

8. The apparatus of claim 7 wherein each of said bottom sweep blades and said side sweep blades has a generally free pivotal connection with said arm and are arranged at an angle to their path of movement and slope away from the path of movement so that the movement of said bottom sweep blade and side sweep blade through a liquid medium in the vat provides the force urging said bottom sweep blade toward said bottom wall and said side sweep blade toward said side wall.

9. Apparatus of the type described comprising, in combination, an elongated vat having a bottom and side walls, a stirring assembly having at least a pair of arms extending into said vat, means for moving said stirring assembly longitudinally in said vat, means for rotating said arms in said vat, said arms arranged to rotate in a circle the diameter of which is less than the minimum distance between opposed points on said side walls, a plurality of stirring blades attached to and movable with said arms, said stirring blades positioned through a vertical area in said vat and a stirring blade on one arm arranged in a vertical position different from the vertical position of a stirring blade connected to another arm, a side sweep blade assembly attached to at least one of said arms, said side sweep blade assembly including a blade member and means connecting said blade member in trailing relation to at least one of said arms for movement with said one arm and for movement toward and away from side wall, said side sweep blade member disposed at an angle and sloping away from the direction of travel thereof with said one arm so that said blade member is urged radially outward with respect to the axis of rotation of said arms to normally follow a circular path having a diameter greater than that of the circle of rotation of said arms and greater than the maximum distance between opposed points on said side wall.

10. The apparatus of claim 9 wherein a pair of said stirring blades are connected to each of said arms, the stirring blades on each arm being spaced vertically with respect to each other and the stirring blades of one arm being staggered with respect to the stirring blades on another arm so that said stirring blades are arranged alternately through a vertical area of said vat.

11. The apparatus of claim 10 including a bottom sweep assembly including a blade member and means connecting said blade member in trailing relation to at least one of said arms for movement with said one arm and for movement toward and away from said bottom wall, said bottom sweep assembly blade member disposed at an angle to and sloping away from the direction of travel thereof with said one arm so that said blade member is urged toward engagement with said bottom wall.

12. Apparatus of the type described comprising, in combination, a vat for holding a liquid medium and including a bottom wall, a stirring assembly extending into said vat, means for moving said stirring assembly in said vat, articulated blade assemblies connected in and movable as a part of said stirring assembly, each of said blade assemblies including a blade member and means connecting said blade member in said stirring assembly for movement toward and away from said vat wall with said blade member being disposed at an oblique angle to its direction of travel in said vat and sloping away from said direction of travel so that movement of said blade assemblies through a liquid medium provides a force urging said blade member toward engagement with said bottom wall, said bottom wall including at least one opening, said blade member having an edge engaging said bottom wall and extending angularly from said bottom wall, and a plate member connected to said blade member and trailing said edge, said plate member engaging said bottom at a distance from said blade member edge sufficient to bridge said opening.

13. Apparatus of the type described comprising, in combination, an elongated vat having a bottom and side walls, a stirring assembly having at least a pair of arms extending into said vat, means for moving said stirring assembly longitudinally in said vat, means for rotating said arms in said vat, said arms arranged to rotate in a circle the diameter of which is less than the minimum distance between opposed points on said side walls, stirring blade means attached to and movable with said arms, said stirring blade means positioned through a vertical area in said vat for displacing liquid in said vat vertically as said blade means are moved through said vat with said stirring assembly, a side sweep blade assembly attached to at least one of said arms, said side sweep blade assembly including a blade and means connecting said blade in trailing relation with said one arm for movement with said one arm and for movement toward and away from a side wall, said side sweep blade disposed at an angle and sloping away from the direction of travel thereof with said one arm so that said blade is urged radially outward with respect to the axis of rotation of said arms to normally follow a circular path having a diameter greater than that of the circle of rotation of said arms and greater than the maximum distance between opposed points on said side wall.

References Cited

UNITED STATES PATENTS

| | | | |
|---|---|---|---|
| 2,513,254 | 6/1950 | Savage et al. | 259—107 |
| 2,884,234 | 4/1959 | Gebhart et al. | 259—134 XR |
| 3,109,632 | 11/1963 | Wiegel | 259—134 XR |
| 3,193,928 | 7/1965 | Collins | 259—102 XR |
| 3,188,677 | 6/1965 | Jamison | 259—107 XR |

WALTER A. SCHEEL, Primary Examiner

JOHN M. BELL, Assistant Examiner

U.S. Cl. X.R.

31—48; 259—107, 134